United States Patent
Farber et al.

(10) Patent No.: US 7,940,303 B1
(45) Date of Patent: *May 10, 2011

(54) METHOD AND SYSTEM FOR DISPLAYING CONTENT WHILE REDUCING BURN-IN OF A DISPLAY

(75) Inventors: Stuart H. Farber, Horsham, PA (US); Daniel L. McGonigal, Lexington, PA (US); Jeremy C. Rosenberg, Havre de Grace, MD (US); Robert M. Steinberg, Horsham, PA (US); Ronald M. Yurman, Short Hills, NJ (US)

(73) Assignee: Music Choice, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/617,203

(22) Filed: Nov. 12, 2009

Related U.S. Application Data (63) Continuation of application No. 10/976,899, filed on Nov. 1, 2004, now Pat. No. 7,626,609, which is a continuation-in-part of application No. 10/383,422, filed on Mar. 7, 2003, now Pat. No. 7,158,169.

(51) Int. Cl.
*H04N 3/20* (2006.01)
*H04N 5/445* (2006.01)
*G06F 3/048* (2006.01)

(52) U.S. Cl. ............... 348/173; 348/563; 348/14.12; 715/867

(58) Field of Classification Search ............... None
See application file for complete search history.

(56) References Cited

U.S. PATENT DOCUMENTS

| | | |
|---|---|---|
| 4,016,362 A | 4/1977 | Bristow et al. |
| 4,081,829 A | 3/1978 | Brown |
| 4,127,796 A | 11/1978 | Henderson et al. |
| RE29,997 E | 5/1979 | den Toonder |
| 4,314,236 A | 2/1982 | Mayer et al. |
| 4,336,478 A | 6/1982 | Quilty et al. |
| 4,338,623 A | 7/1982 | Asmus et al. |
| 4,360,805 A | 11/1982 | Andrews et al. |
| 4,677,430 A | 6/1987 | Falkman et al. |
| 4,722,005 A | 1/1988 | Ledenbach |
| 4,760,455 A | 7/1988 | Nagashima |
| 4,799,156 A | 1/1989 | Shavit et al. |
| 5,130,615 A | 7/1992 | George |
| 5,168,481 A | 12/1992 | Culbertson et al. |
| 5,193,006 A | 3/1993 | Yamazaki |

(Continued)

FOREIGN PATENT DOCUMENTS

EP 1 022 900 A1 7/2000

(Continued)

OTHER PUBLICATIONS

"The ICTV Digital Broadband System", ICTV Inc., ICTV Whitepaper, Nov. 2000, 11 pages.

(Continued)

*Primary Examiner* — Brian Yenke

(74) *Attorney, Agent, or Firm* — Rothwell, Figg, Ernst & Manbeck, P.C.

(57) ABSTRACT

A method and system for reducing burn-in of a display is disclosed. A plurality of assets containing text, graphics, and video are stored. Some of these assets are then assembled into a video frame or "screen", which is subsequently output. Some of the assets are then assembled to form a second video frame or screen. The second screen is subsequently output to the video transport stream and the process is repeated.

20 Claims, 6 Drawing Sheets

U.S. PATENT DOCUMENTS

| | | | |
|---|---|---|---|
| 5,282,028 A | 1/1994 | Johnson et al. | |
| 5,283,639 A | 2/1994 | Esch et al. | |
| 5,341,350 A | 8/1994 | Frank et al. | |
| 5,355,302 A | 10/1994 | Martin et al. | |
| 5,365,381 A | 11/1994 | Scheffler | |
| 5,371,551 A | 12/1994 | Logan et al. | |
| 5,418,654 A | 5/1995 | Scheffler | |
| 5,481,296 A | 1/1996 | Cragun et al. | |
| 5,481,509 A | 1/1996 | Knowles | |
| 5,499,046 A | 3/1996 | Schiller et al. | |
| 5,534,911 A | 7/1996 | Levitan | |
| 5,542,037 A | 7/1996 | Sato et al. | |
| 5,550,863 A | 8/1996 | Yurt et al. | |
| 5,557,541 A | 9/1996 | Schulhof et al. | |
| 5,559,548 A | 9/1996 | Davis et al. | |
| 5,572,442 A | 11/1996 | Schulhof et al. | |
| 5,585,866 A | 12/1996 | Miller et al. | |
| 5,588,096 A | 12/1996 | Sato et al. | |
| 5,590,282 A | 12/1996 | Clynes | |
| 5,592,511 A | 1/1997 | Schoen et al. | |
| 5,616,876 A | 4/1997 | Cluts | |
| 5,617,565 A | 4/1997 | Augenbraun et al. | |
| 5,629,867 A | 5/1997 | Goldman | |
| 5,635,989 A | 6/1997 | Rothmuller | |
| 5,636,276 A | 6/1997 | Brugger | |
| 5,657,096 A | 8/1997 | Lukacs | |
| 5,675,734 A | 10/1997 | Hair | |
| 5,689,081 A | 11/1997 | Tsurumi | |
| 5,708,780 A | 1/1998 | Levergood et al. | |
| 5,721,815 A | 2/1998 | Ottesen et al. | |
| 5,726,909 A | 3/1998 | Krikorian | |
| 5,734,719 A | 3/1998 | Tsevdos et al. | |
| 5,734,961 A | 3/1998 | Castille | |
| 5,740,549 A | 4/1998 | Reilly et al. | |
| 5,751,282 A | 5/1998 | Girard et al. | |
| 5,753,844 A | 5/1998 | Matsumoto | |
| 5,754,939 A | 5/1998 | Herz et al. | |
| 5,761,606 A | 6/1998 | Wolzien | |
| 5,761,607 A | 6/1998 | Gudesen | |
| 5,761,662 A | 6/1998 | Dasan | |
| 5,781,889 A | 7/1998 | Martin et al. | |
| 5,784,095 A | 7/1998 | Robbins et al. | |
| 5,784,595 A | 7/1998 | Devins et al. | |
| 5,790,935 A | 8/1998 | Payton | |
| 5,793,980 A | 8/1998 | Glaser et al. | |
| 5,796,423 A | 8/1998 | Robbins et al. | |
| 5,796,945 A | 8/1998 | Tarabella | |
| 5,809,144 A | 9/1998 | Sirbu et al. | |
| 5,809,246 A | 9/1998 | Goldman | |
| 5,810,603 A | 9/1998 | Kato | |
| 5,818,512 A | 10/1998 | Fuller | |
| 5,819,049 A | 10/1998 | Rietmann | |
| 5,819,160 A | 10/1998 | Foladare et al. | |
| 5,819,284 A | 10/1998 | Farber et al. | 709/203 |
| 5,832,120 A | 11/1998 | Prabhakar et al. | |
| 5,835,487 A | 11/1998 | Campanella | |
| 5,841,979 A | 11/1998 | Schulhof et al. | |
| 5,848,398 A | 12/1998 | Martin et al. | |
| 5,861,906 A | 1/1999 | Dunn et al. | |
| 5,878,141 A | 3/1999 | Daly et al. | |
| 5,885,085 A | 3/1999 | Fujita | |
| 5,890,137 A | 3/1999 | Koreeda | |
| 5,890,139 A | 3/1999 | Suzuki et al. | |
| 5,899,699 A | 5/1999 | Kamiya | |
| 5,899,980 A | 5/1999 | Wilf et al. | |
| 5,900,566 A | 5/1999 | Mino et al. | |
| 5,900,830 A | 5/1999 | Scheffler | |
| 5,913,204 A | 6/1999 | Kelly | |
| 5,918,213 A | 6/1999 | Bernard et al. | |
| 5,926,624 A | 7/1999 | Katz et al. | |
| 5,930,765 A | 7/1999 | Martin et al. | |
| 5,930,768 A | 7/1999 | Hooban | |
| 5,931,901 A | 8/1999 | Wolfe et al. | |
| 5,933,500 A | 8/1999 | Blatter et al. | |
| 5,943,422 A | 8/1999 | Van Wie et al. | |
| 5,944,608 A | 8/1999 | Reed et al. | |
| 5,959,945 A | 9/1999 | Kleiman | |
| 5,960,411 A | 9/1999 | Hartman et al. | |
| 5,961,662 A | 10/1999 | Yamaguchi et al. | |
| 5,968,120 A | 10/1999 | Guedalia | |
| 5,969,283 A | 10/1999 | Looney et al. | |
| 5,970,474 A | 10/1999 | LeRoy et al. | |
| 5,973,722 A | 10/1999 | Wakai et al. | |
| 5,980,261 A | 11/1999 | Mino et al. | |
| 5,986,692 A | 11/1999 | Logan et al. | |
| 5,991,374 A | 11/1999 | Hazenfield | |
| 5,991,737 A | 11/1999 | Chen | |
| 6,011,761 A | 1/2000 | Inoue | |
| 6,011,854 A | 1/2000 | Van Ryzin | |
| 6,020,883 A | 2/2000 | Herz et al. | |
| 6,021,432 A | 2/2000 | Sizer, II et al. | |
| 6,025,868 A | 2/2000 | Russo | |
| 6,035,336 A | 3/2000 | Lu | |
| 6,038,591 A | 3/2000 | Wolfe et al. | |
| 6,055,314 A | 4/2000 | Spies et al. | |
| 6,055,566 A | 4/2000 | Kikinis | |
| 6,085,235 A | 7/2000 | Clarke, Jr. et al. | |
| 6,088,455 A | 7/2000 | Logan et al. | |
| 6,088,722 A | 7/2000 | Herz et al. | |
| 6,105,060 A | 8/2000 | Rothblatt | |
| 6,108,028 A | 8/2000 | Skarbo et al. | |
| 6,118,450 A | 9/2000 | Proehl | |
| 6,135,646 A | 10/2000 | Kahn et al. | |
| 6,151,634 A | 11/2000 | Glaser et al. | |
| 6,154,772 A | 11/2000 | Dunn et al. | |
| 6,161,142 A | 12/2000 | Wolfe et al. | |
| 6,192,340 B1 | 2/2001 | Abecassis | |
| 6,210,170 B1 | 4/2001 | Sorensen | |
| 6,223,210 B1 | 4/2001 | Hickey | |
| 6,223,292 B1 | 4/2001 | Dean et al. | |
| 6,226,030 B1 | 5/2001 | Harvey et al. | |
| 6,226,618 B1 | 5/2001 | Downs et al. | |
| 6,229,895 B1 | 5/2001 | Son et al. | |
| 6,230,322 B1 | 5/2001 | Saib et al. | |
| 6,232,539 B1 | 5/2001 | Looney et al. | |
| 6,233,682 B1 | 5/2001 | Fritsch | |
| 6,240,553 B1 | 5/2001 | Son et al. | |
| 6,243,725 B1 | 6/2001 | Hempleman et al. | |
| 6,246,672 B1 | 6/2001 | Lumelsky | |
| 6,248,946 B1 | 6/2001 | Dwek | |
| 6,249,810 B1 | 6/2001 | Kiraly | |
| 6,253,235 B1 | 6/2001 | Estes | |
| 6,253,237 B1 | 6/2001 | Story et al. | |
| 6,256,008 B1 | 7/2001 | Sparks et al. | |
| 6,262,772 B1 | 7/2001 | Shen et al. | |
| 6,266,369 B1 | 7/2001 | Wang et al. | |
| 6,279,040 B1 | 8/2001 | Ma et al. | |
| 6,286,139 B1 | 9/2001 | Decinque | |
| 6,305,020 B1 | 10/2001 | Hoarty et al. | |
| 6,313,878 B1 | 11/2001 | Jankowiak | 348/377 |
| 6,324,217 B1 | 11/2001 | Gordon | |
| 6,330,595 B1 | 12/2001 | Ullman et al. | |
| 6,330,609 B1 | 12/2001 | Garofalakis et al. | |
| 6,338,044 B1 | 1/2002 | Cook et al. | |
| 6,349,329 B1 | 2/2002 | MacKintosh | |
| 6,364,485 B1 | 4/2002 | Fateh | |
| 6,369,851 B1 | 4/2002 | Marflak et al. | |
| 6,389,467 B1 | 5/2002 | Eyal | |
| 6,418,421 B1 | 7/2002 | Hurtado et al. | |
| 6,434,747 B1 | 8/2002 | Khoo et al. | |
| 6,446,130 B1 | 9/2002 | Grapes | |
| 6,448,956 B1 | 9/2002 | Berman et al. | |
| 6,456,335 B1 | 9/2002 | Miura | |
| 6,486,900 B1 | 11/2002 | Shen | |
| 6,490,728 B1 | 12/2002 | Kitazato | |
| 6,505,240 B1 | 1/2003 | Blumenau | |
| 6,526,411 B1 | 2/2003 | Ward | |
| 6,539,210 B1 | 3/2003 | Heredia et al. | 455/154.1 |
| 6,550,011 B1 | 4/2003 | Sims, III | |
| 6,587,127 B1 | 7/2003 | Leeke et al. | |
| 6,587,837 B1 | 7/2003 | Spagna et al. | |
| 6,588,015 B1 | 7/2003 | Eyer et al. | |
| 6,636,220 B1 | 10/2003 | Szeliski et al. | |
| 6,643,326 B1 | 11/2003 | Fukunaga et al. | |
| 6,668,158 B1 | 12/2003 | Tsutsui | |

| | | |
|---|---|---|
| 6,748,427 B2 | 6/2004 | Drosset |
| 6,757,833 B2 | 6/2004 | Wakai et al. |
| 6,766,357 B1 | 7/2004 | Fandozzi |
| 6,842,604 B1 | 1/2005 | Cook et al. |
| 6,856,328 B2 | 2/2005 | Holtslag ............... 345/690 |
| 6,856,550 B2 | 2/2005 | Kato et al. |
| 6,865,550 B1 | 3/2005 | Cok |
| 6,898,800 B2 | 5/2005 | Son et al. |
| 6,907,574 B2 | 6/2005 | Xu et al. |
| 6,924,845 B1 | 8/2005 | Wahlroos |
| 6,933,433 B1 | 8/2005 | Porteus et al. |
| 6,966,064 B1 | 11/2005 | Schneidewend et al. |
| 6,990,312 B1 | 1/2006 | Gioscia |
| 7,010,801 B1 | 3/2006 | Jerding |
| 7,020,888 B2 | 3/2006 | Reynolds et al. |
| 7,028,082 B1 | 4/2006 | Rosenberg et al. |
| 7,065,287 B1 | 6/2006 | Heredia et al. |
| 7,076,561 B1 | 7/2006 | Rosenberg et al. |
| 7,133,924 B1 | 11/2006 | Rosenberg et al. |
| 7,149,471 B1 | 12/2006 | Arisawa et al. |
| 7,158,169 B1 | 1/2007 | Farber et al. |
| 7,209,649 B2 | 4/2007 | Kobayashi ............... 386/125 |
| 7,209,900 B2 | 4/2007 | Hunter et al. |
| 7,275,256 B1 | 9/2007 | Del Beccaro et al. |
| 7,308,485 B2 | 12/2007 | Roberts et al. |
| 7,313,810 B1 | 12/2007 | Bell |
| 7,321,923 B1 | 1/2008 | Rosenberg et al. ............ 709/217 |
| 7,492,355 B2 | 2/2009 | Zemer et al. ............ 345/172 |
| 2001/0032312 A1 | 10/2001 | Runje |
| 2001/0035874 A1 | 11/2001 | Hamilton et al. |
| 2001/0042107 A1 | 11/2001 | Palm |
| 2001/0049826 A1 | 12/2001 | Wilf |
| 2002/0021708 A1 | 2/2002 | Ishiai |
| 2002/0023164 A1 | 2/2002 | Lahr |
| 2002/0023166 A1 | 2/2002 | Bar-Noy et al. |
| 2002/0032728 A1 | 3/2002 | Sako et al. |
| 2002/0038359 A1 | 3/2002 | Ihara et al. |
| 2002/0046084 A1 | 4/2002 | Steele et al. |
| 2002/0056117 A1 | 5/2002 | Hasegawa et al. |
| 2002/0056118 A1 | 5/2002 | Hunter et al. |
| 2002/0059621 A1 | 5/2002 | Thomas et al. |
| 2002/0062261 A1 | 5/2002 | Mukai |
| 2002/0075321 A1 | 6/2002 | Sakatani |
| 2002/0083148 A1 | 6/2002 | Shaw et al. |
| 2002/0104082 A1 | 8/2002 | Fries |
| 2002/0130892 A1 | 9/2002 | Holtslag ............... 345/690 |
| 2002/0138630 A1 | 9/2002 | Solomon et al. |
| 2002/0152278 A1 | 10/2002 | Pontenzone et al. |
| 2002/0184623 A1 | 12/2002 | Hodge et al. |
| 2002/0194260 A1 | 12/2002 | Headley et al. |
| 2002/0194619 A1 | 12/2002 | Chang et al. |
| 2003/0023975 A1 | 1/2003 | Schrader et al. |
| 2003/0050058 A1 | 3/2003 | Walsh et al. |
| 2003/0097338 A1 | 5/2003 | Mankovich et al. |
| 2003/0135464 A1 | 7/2003 | Mourad et al. |
| 2003/0142212 A1 | 7/2003 | Grimes et al. |
| 2003/0169249 A1 | 9/2003 | Masuda et al. ............ 345/211 |
| 2003/0169306 A1 | 9/2003 | Makipaa et al. |
| 2003/0182184 A1 | 9/2003 | Strasnick et al. |
| 2004/0041849 A1 | 3/2004 | Mock et al. |
| 2005/0060669 A1 | 3/2005 | Lowles ............... 715/867 |
| 2005/0160377 A1 | 7/2005 | Sciammarella et al. |
| 2005/0201254 A1 | 9/2005 | Looney et al. ............ 369/124.01 |
| 2006/0041639 A1 | 2/2006 | Lamkin et al. ............ 709/219 |
| 2006/0173974 A1 | 8/2006 | Tang |
| 2007/0058042 A1 | 3/2007 | Farber et al. ............ 348/173 |

FOREIGN PATENT DOCUMENTS

| | | |
|---|---|---|
| JP | 11260045 A | 9/1999 |
| JP | 2000207417 A | 7/2000 |
| JP | 2000305588 A | 11/2000 |
| JP | 2002215174 A | 7/2002 |
| WO | WO 93/18465 A1 | 9/1993 |
| WO | WO 97/37492 A1 | 10/1997 |
| WO | WO 99/17230 A1 | 4/1999 |
| WO | WO 99/48296 A1 | 9/1999 |
| WO | WO 00/07368 A1 | 2/2000 |
| WO | WO 01/36064 A1 | 5/2001 |

OTHER PUBLICATIONS

"Worldgate Offers Java For Internet-Over-Cable Service", Computergram International, Nov. 18, 1998, 1 page.

"WorldGate Receives Patent for Ultra Thin-Client Computing Architecture; Technology Key for Using Existing Cable Plant for Delivering Internet Access Through the TV", Business Wire, Sep. 7, 1999, 2 pages.

"Music Choice and WorldGate Team Up to Offer Simultaneous Music Listening", Business Wire, May 5, 1998, 2 pages.

Balachandran et al., "Rapid Video Browsing on a VCR Using a TV Set-top Box", IRMA International Conference, 2000, pp. 250-254.

Weather Channel Broadcast from Apr. 4, 2000, TWC Broadcast, www.twctoday.com/xl.html, 3 pages.

Barry Fox, "Orbiting TV pictures dodge screen burn", NewScientist. com news service, Mar. 21, 2002, 2 pages.

"Challenges of Information Technology Management in the 21$^{st}$ Century", IRMA International Conference, 2000, cover page and table of contents, 11 pages.

Radio Sonicnet Screenshots from archive.org., 6 pages.

Complaint for Patent Infringement, Civil Action No. 08-130(SLR), dated Mar. 4, 2008, 8 pages.

Answer and Counterclaim of Defendants, Civil Action No. 08-130(SLR), dated Apr. 23, 2008, 11 pages.

Answer to Counterclaims, Civil Action No. 08-130(SLR), dated May 5, 2008, 5 pages.

Responses of Plaintiff Music Choice to Defendants' First Set of Requests for Production of Documents and Things, Civil Action No. 08-130 (SLR), dated Jul. 14, 2008, 36 pages.

Responses of Plaintiff Music Choice to Defendant MTV Networks First Set of Interrogatories (Nos. 1-13) with Exhibits 1-5, Civil Action No. 08-130 (SLR), dated Jul. 14, 2008, 97 pages.

Viacom International Inc.'s Responses to Plaintiff's First Set of Requests for Production (Nos. 1-85), Civil Action No. 08-130 (SLR), dated Jul. 14, 2008, 67 pages.

Viacom Inc.'s Responses to Plaintiff's First Set of Requests for Production (Nos. 1-85), Civil Action No. 08-130 (SLR), dated Jul. 14, 2008, 65 pages.

MTV Networks' Responses to Plaintiff's First Set of Requests for Production (Nos. 1-85), Civil Action No. 08-130 (SLR), dated Jul. 14, 2008, 65 pages.

Viacom Inc.'s Response to Plaintiff's First Set of Interrogatories (Nos. 1-13), Civil Action No. 08-130 (SLR), dated Jul. 14, 2008, 20 pages.

MTV Network's Response to Plaintiff's First Set of Interrogatories (Nos. 1-13), Civil Action No. 08-130 (SLR), dated Jul. 14, 2008, 22 pages.

Viacom International's Response to Plaintiff's First Set of Interrogatories (Nos. 1-13), Civil Action No. 08-130 (SLR), dated Jul. 14, 2008, 21 pages.

Viacom International Inc.'s Responses to Plaintiff's Second Set of Requests for Production (Nos. 86-103), Civil Action No. 08-130 (SLR), dated Jul. 30, 2008, 19 pages.

MTV Networks' Responses to Plaintiff's Second Set of Requests for Production (Nos. 86-103), Civil Action No. 08-130 (SLR), dated Jul. 30, 2008, 19 pages.

Viacom Inc.'s Responses to Plaintiff's Second Set of Requests for Production (Nos. 86-103), Civil Action No. 08-130 (SLR), dated Jul. 30, 2008, 18 pages.

Plaintiff Music Choice's First Supplemental Responses to Defendant MTV Network's First Set of Interrogatories, Civil Action No. 08-130 (SLR), dated Jan. 9, 2009, 20 pages.

Defendants' Amended Response to Plaintiff's Contention Interrogatories on Which Defendants Bear Burden of Proof (No. 5) with Exhibit A, Civil Action No. 08-130 (SLR), dated Jan. 9, 2009, 264 pages.

Plaintiff Music Choice's Responses to Defendant Viacom International Inc.'s First Set of Interrogatories (Nos. 1-13), Civil Action No. 08-130 (SLR), dated Jan. 9, 2009, 24 pages.

Defendants' Amended Responses to Plaintiffs First Set of Interrogatories 1-13 with Supplement to Exhibit A, Civil Action No. 08-130 (SLR), dated Jan. 20, 2009, 27 pages.

Defendants' Amended Responses to Plaintiff's Responsive Contention Interrogatories Nos. 3,4,6,10, Civil Action No. 08-130 (SLR), dated Feb. 9, 2009, 15 pages.

Plaintiff's Supplemental Response to Defendants' Contention Interrogatories on Which Defendants Bear the Burden of Proof, Civil Action No. 08-130 (SLR), dated Feb. 9, 2009, 89 pages.

6 Pages from the web site for www.request.com. (Jun. 22, 2004).

Clark D., ClickRadio to Start Digital Music Services, WSJ Interactive Edition, 2000.

"ClickRadio granted first interactive radio license by universal music group; . . . ," www.clickradio.com, printed Apr. 20, 2000.

Gordon, C., "ClickRadio sidesteps competition with music licensing deals," Atnewyork.com., May 12, 2000.

"Phillips Showcases ClickRadio on digital set-top at western show 2000; . . . ," Business Wire, Inc., Nov. 29, 2000.

Web site for www.sonicnet.com., printed Jun. 22, 2004, 6 pages.

ntl: Digital Radio. http://www.ntl.com/locales/gb/en/guides/dummies/produce.asp (Aug. 13, 2002).

Bower (1998). "Digital Radio—A Revolution for In-Car Entertainment" Proc. NavPos Automative '98 Conf. 2(5-8): 40-51.

Deutsche Telekom AG: Digital Radio. http://www.telekom.de/dtag/ip11/cda/level3_a/0,3680,10077,00.html (Aug. 18, 2000).

The Eureka 147 Consortium. "Digital Audio Broadcasting" http://www.eureadab.org/eureka_147_consortium.htm (Aug. 14, 2000).

Radio Authority (1999). Digital Radio Fact Sheet No. 4. http://www.radioauthority.org.uk/Information/Fact_Sheets/fs4.htm (Aug. 18, 2000).

ICTV (2000). Digital Broadband System Press Release: 1-11 (Nov. 2000).

Launch.com (Jun. 25, 2004).

"Sonicbox brings Net radio into your living room" (Partyka, Jeff. Oct. 12, 1999. CNN.com).

"Internet Radio Listeners Unchained From Their PCs" (Olenick, Doug. Oct. 25, 1999. Twice Computer Technology).

"Sonicbox and Microsoft Bring Windows Media Internet Radio to the home Stereo" (Dec 7, 1999 Microsoft Press Release).

"Turn on, Tune in, Drop Cash" (King, Brad. Dec 8, 2000. Wired News).

"Global Media Announces Launch of Independent Internet Radio station; Station includes E-Commerce Point of Purchase for Music" (Feb. 1, 1999. Business Wire).

"Platinum Entertainment and Liquid Audio Join Forces to Offer Extensive Music Catalog via Digital Downloads" (Jul. 15, 1998, PR Newswire).

"Thinking Globally with a web-based radio station vying for listeners around the world, homegrown internet company fastband aims to shake up the music world" (LaFrance, Siona. Nov. 4, 1999. Times).

"Tune into Yahoo! Radio; Yahoo! teams up with Broadcast.com and Spinner.com to Provide 10 stations of Audio Programming" (May 11, 1999. Business Wire).

Yahoo Offers one-stop shop for e-music (Aug. 25, 1999. Milwaukee Journal Sentinel).

Yahoo! Press Release, (Oct. 19, 1999).

"WebRadio.com Signs on as Liquid Music Network Affiliate Offering Liquid Audio Digital Downloads" (Sep. 1, 1999. Business Wire).

"Blue Note Radio: Now Playing on a Computer Screen Near You. EMI's Blue Note Records Expands New Media Initiative with RadioWave.com" (Apr. 4, 2000. PR Newswire).

"Set-top box that reads your mind" Taylors, Paul. Dec. 30, 1998. Financial Times, London.

Rajapakshe, H. et al., "Video on Demand," Jun. 1995, pp. 1-15.

Welz, G., "Integrated Streaming Technologies," Oct. 30, 1996, pp. 1-3.

Music Choice, "Music Choice on-Screen Transmission Specification", May 4, 1999: 23 pages.

Music Choice, "Goals & Milestones", date unknown, 5 pages.

Music Choice, "On-Screen Data Center Program, Interface Agreement", Jun. 20, 2000,19 pages.

Music Choice, "Music Choice Phase I DCS Deliverables Descriptions", May 2000, 4 pages.

Music Choice, "Music Choice On-Screen Program", Jun. 28, 2000, 9 pages.

Music Choice, "Proposed Music Choice On-Screen System", date unknown, 6 pages.

Music Choice, "Music Choice On-Screen R.F.P.", Jan. 2000, 14 pages.

R. Steinberg,"Music Choice On-Screen RFP #2", Sep. 24, 2001, 8 pages.

K. Giannetti et al., "Request for Proposal for Music Choice On-Screen", May 3, 1999, 14 pages.

K. Giannetti et al., "On-Screen Functional Specification", Apr. 25, 1999, 5 pages.

Music Choice, "On-Screen Program, Initial Enterprise Architecture", Sep. 1999, 37 pages.

R. Steinberg, "Music Choice On-Screen Transaction Processing RFP", Apr. 28, 2000, 14 pages.

Office Action issued in U.S. Appl. No. 11/599,274 on Jan. 18, 2008, 10 pp.

Office Action issued in U.S. Appl. No. 10/066,793 on Sep. 27, 2006, 8 pp.

Office Action issued in U.S. Appl. No. 10/066,793 on Mar. 15, 2007, 5 pp.

Notice of Allowability issued in U.S. Appl. No. 10/066,793 on Jun. 18, 2007, 4 pp.

Reply to Office Action filed in U.S. Appl. No. 11/599,274 on Jun. 12, 2008, 12 pp.

Pending claims in U.S. Appl. No. 11/837,772, 6 pp. (Aug. 13, 2007).

Information Disclosure Statement filed in U.S. Appl. No. 10/066,793 on Dec. 26, 2006, 3 pp.

Office Action issued in U.S. Appl. No. 10/383,422 on May 19, 2006, 5 pp.

Office Action issued in U.S. Appl. No. 10/383,422 on Nov. 28, 2005, 8 pp.

```
<?xml version="1.0"?>
<!DOCTYPE Scrn SYSTEM "file:///data/mc/MusicChoice.dtd">
<Scrn hgt="480" wid="704"
chan="001" chName="Soft Rock" Seq="02262">
<IntWin xPos="200" yPos="90" xSz="390" ySz="236"
BgCl="0x1E1E1E" FgCl="0xC4C3C8" InCl="0xB71E16"
BgSl="0xB71E16" BtSl="0xB71E16" BdSl="0xC8C800" />
<Grobj
xPos="214" yPos="92" xSz="214" ySz="251" wid="214" hgt="251"
pos="1" >
 <SongTitle value="Are You Ready For Love (2003)"/>
 <Artist value="Elton John"/>
 <RecordLabel value="ULTRA"/>
 <CD value="Elton John's Greatest Hits 1970-2002"/>
 <UniqID value="3310722"/>
</Grobj>
<Grobj src="mcBT_BuyPrevious_1.jpg" desc="Buy Previous Button"
xPos="209" yPos="314" xSz="129" ySz="37" wid="129" hgt="37"
pos="2" />
<Grobj src="mcAA1730327.jpg" desc="Elton John's Greatest
Hits 1970-2002"
xPos="501" yPos="338" xSz="100" ySz="100" wid="100" hgt="100"
pos="3" />
<Grobj src="mcBA506412.jpg" Billable="N"
xPos="336" yPos="128" xSz="320" ySz="192" wid="320" hgt="192"
pos="4" />
<Grobj src="mcLG39.jpg"
xPos="29" yPos="46" xSz="139" ySz="55" wid="139" hgt="55" pos="6"
/>
<Grobj src="mcPB408179.jpg" desc="347582" Billable="N"
xPos="80" yPos="128" xSz="240" ySz="192" wid="240" hgt="192"
pos="7" />
<Grobj src="mcBT_NotAvailable_1.jpg" desc="Not Available"
xPos="76" yPos="314" xSz="129" ySz="37" wid="129" hgt="37"
pos="8" />
<Grobj src="mcBT_NoDownload_1.jpg" desc="No Download"
xPos="312" yPos="342" xSz="129" ySz="37" wid="129" hgt="37"
pos="9" />
<Grobj src="mcWP_Set2_LR.jpg"
xPos="0" yPos="0" xSz="704" ySz="480" wid="704" hgt="480"
pos="10" />
</Scrn>
```

FIG. 6

METHOD AND SYSTEM FOR DISPLAYING CONTENT WHILE REDUCING BURN-IN OF A DISPLAY

CROSS-REFERENCE TO RELATED APPLICATIONS

This application is a continuation of U.S. patent application Ser. No. 10/976,899, filed on Nov. 1, 2004 (status pending), which is a continuation-in-part of U.S. patent application Ser. No. 10/383,422, filed on Mar. 7, 2003 (now U.S. Pat. No. 7,158,169). The above identified applications and patents are incorporated herein by reference.

BACKGROUND OF THE INVENTION

1. Field of the Invention

This invention is related to a method and system for displaying content while prolonging the life of a display by reducing phosphor burning on the display.

2. Discussion of the Background

Displays such as cathode ray tubes (CRTs) are well known for displaying motion pictures and other content such as graphical or textual content. A typical CRT has a screen that is coated on an inner surface with phosphorescent material arranged in a given pattern. The phosphorescent material glows when bombarded by electron beams emanating from electron guns to form a pattern corresponding to an image. In time, the glowing causes the phosphorescent material to wear, thus affecting its ability to display an image on the screen. It is desirable to have the phosphorescent material wear evenly across the entire screen so that over time the contrast and image display capabilities are uniform across the entire screen. Similar wear can occur with projection and plasma displays as well. It is equally desirable for these devices to exhibit even wear of the materials that facilitate their luminance.

In displays, for example, images move frequently as in a motion picture, thus allowing various parts of the phosphorescent material on the screen to glow at different times. This has an averaging effect on the wear characteristics such that no localized area of the phosphorescent material on the screen wears more or less than an adjacent localized area. However, in other instances, displayed images may contain various stationary content such as pictures, text, graphics or other stationary content. Additionally, as in the case of text, a sharp contrast may exist between the glowing areas of the text and the adjoining areas of the screen. The stationary aspect of the image, and especially the sharp contrast combined with the stationary aspect, causes uneven phosphorescent material wear characteristics between adjacent localized areas on the screen. Damage can result to the phosphorescent screen in these areas such that images are burned into the screen leaving an undesirable permanent scar in the phosphorescent coating. As a consequence, when further images are displayed in the scarred area, the outline of the image may be blurred or the outline of the scar may remain partially or totally visible. This effect is well known in the industry as screen burn-in.

In order to address this burn-in problem, various methods have been developed. For example, in computer applications where a CRT is used as a monitor, the computer generates various screen savers which turn off the still text and replace it with moving images until the user desires to view the textual information again at which time the screen saver is removed.

U.S. Pat. No. 4,677,430 teaches a method for operating a display monitor to prevent burn-in of the screen. This patent discloses a method of moving displayed images by changing the temporal relationship between the information signal transmitted to the monitor and signals used to synchronize the scanning of the screen. The synchronizing signal is delayed with respect to the information signal and the delay is sequentially increased from a minimum delay to a maximum delay and then sequentially decreased back to the minimum delay over a relatively long period of time. The effect of this method is that the entire screen is shifted by a vertical displacement and/or a horizontal displacement.

U.S. Patent Application Publication Number US2001/0035874 discloses a method for reducing burn-in of a CRT that is used in closed circuit television (CCTV) applications. In these applications, text is typically overlaid on a video image, usually at the bottom of the screen. This patent application teaches a method of moving the overlaid text in a window by an amount in either the x or y-axes. This US2001/0035874 allows for textual information to be moved on the screen by inserting a blank space or moving a blank space in each character line by utilizing the character generator chip to provide blanked out portions. The method periodically changes the location of the textual information overlaid onto the video image by altering the information itself so that the information is continuously available, but does not remain in the same place for prolonged period of time thus avoiding burn-in of the textual information.

In certain applications, for example, in the transmission of music over cable television or satellite television networks, various content is typically displayed in conjunction with a broadcast music channel. In other applications, such as local display of advertising content on an in store display, or various other local broadcasts some content may remain stationary, resulting in screen burn-in. This content may include various components, such as, but not limited to, an image of the album cover, artist information, music trivia, channel title, various logos, advertising material, and various other content. Some of the content may remain relatively stationary on the screen with risk of causing burn-in. The methods developed thus far are each problematic or unusable in this application. For example, screen savers are not usable since they typically make the content temporarily unavailable or unreadable. The method utilized in U.S. Pat. No. 4,677,430 discussed above is not feasible for this application because it is undesirable and impractical to modify the synchronizing signal in order to cause shifting of the screen. The method of U.S. Patent Application Publication Number US2001/0035874 allows for textual information to be moved on the screen by inserting a blank space or moving a blank space in each character line by utilizing the character generator chip to provide blanked out portions. This method is not feasible for non-textual content that is displayed as an image in an area of the screen.

What is needed is a system and method for reducing screen burn-in of a user's display which is useful in applications where various content including but not limited to images, text, or graphics is displayed.

SUMMARY OF THE INVENTION

The invention provides a method and system for reducing uneven burn-in of a display during usage. A plurality of assets or "graphic objects" that may include text, graphics, and video are stored and then gathered. These assets are then assembled based on a template to form a video frame or "screen", which is subsequently output to a display. Based upon a trigger, the assets are gathered again and reassembled based on a second template to form a second video frame or "screen" wherein the assets are in positions on the screen, which are different from those of the first screen. The second screen is subsequently output to the display.

BRIEF DESCRIPTION OF THE DRAWINGS

The invention will now be described by way of example with reference to the accompanying figures of which.

DETAILED DESCRIPTION OF PREFERRED EMBODIMENTS

The method for displaying content while reducing burn-in on a display will now be described with reference to FIGS. 1-3.

Figure 1:
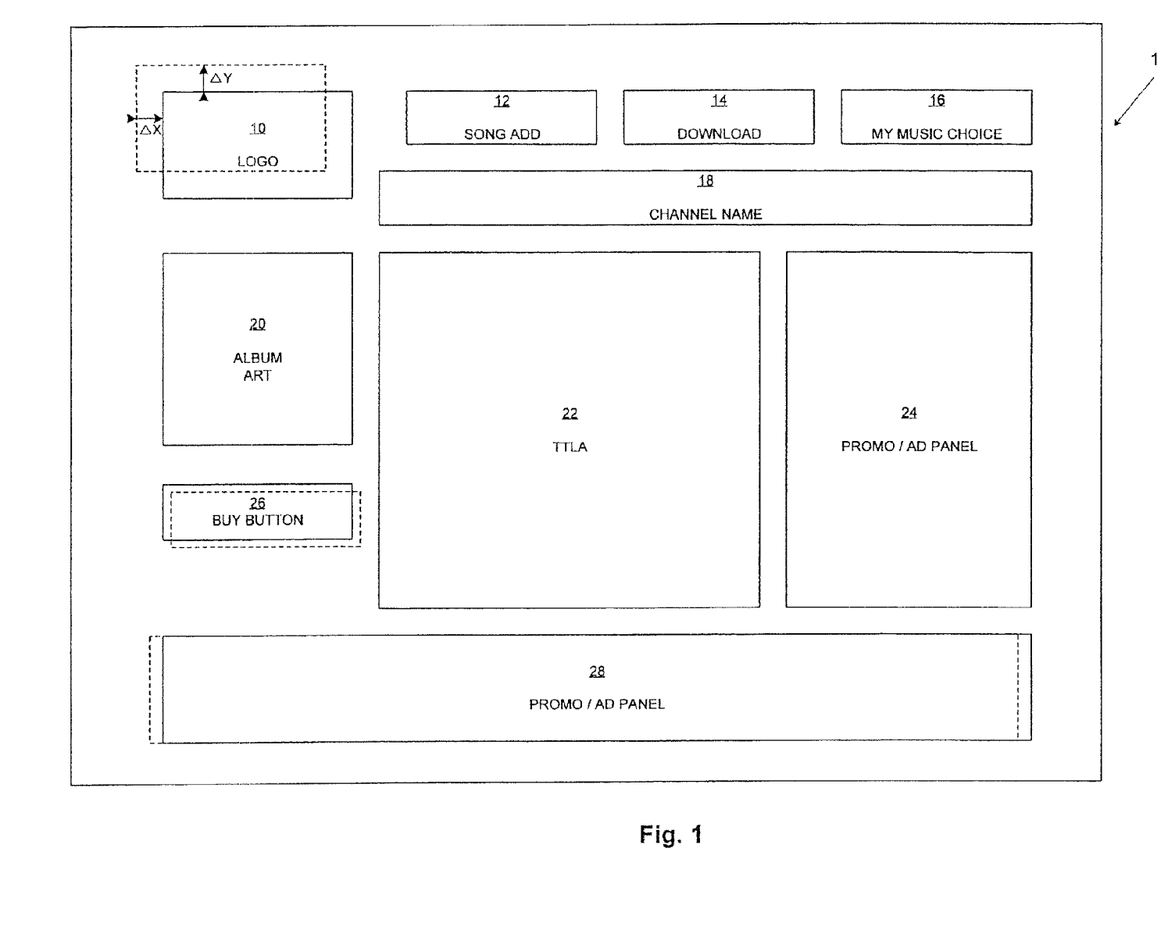
FIG. 1 is a diagrammatic view of a screen for display according to the present invention.

Referring first to FIG. 1, an exemplary screen 1 is shown containing various information and other content. Each of the items of content will hereinafter be referred to as an asset or "graphic object". These assets may include, but are not limited to, textual information, motion picture video, graphics, control features such as buttons or pull down menus, promotional materials, or other control mechanisms. Referring first to FIG. 1, a plurality of assets are displayed on the screen 1. Those reasonably skilled in the art will appreciate that while certain assets will be described in these embodiments, other types of assets may be substituted.

FIG. 1 shows a screen 1 which is displayed coincident with the transmission of a broadcast music channel. The screen 1 contains various assets including a logo 10, a song add button 12, a download button 14, a personalized channel choice button 16, a channel name 18, album art 20, title track label and artist information 22, promotional/advertising panels 24, 28 and a buy button 26.

The logo and the album art assets 10, 20 contain graphical content while the channel name and title track label and artist assets 18, 22 contain primarily textual content but may also contain graphical content. The promotion/advertising panels 24, 28 may contain a combination of graphic and textual content and may alternatively contain motion picture video content.

The assets described thus far, namely 10, 18, 20, 22, 24, and 28, are primarily for the purpose of conveying information to the viewer either graphically, textually, or through video. The remaining assets, namely the song add button 12, the download button 14, the personalized choice button 16, or the buy button 26, may each contain graphical and/or textual content for the purpose of allowing the user to make a selection or transfer control of the system to another sub-screen for various purposes.

For example, these control buttons may be utilized to create a personalized music channel, to indicate music preferences of the user, to download a selected song, or to buy a selected album or track. It should be noted that each of the assets 12, 14, 16, 26 are arranged on the screen 1 in a given orientation and at a selected location, which is shown here as being bound by a border. It should be understood that in all cases the border is simply indicative of the location of the particular asset on the screen and not necessarily visible to the viewer.

In order to reduce screen burn-in, each of the assets may be shuffled around the screen 1 to create alternate orientations. For example, in FIG. 2, screen 2 is shown in which some of the assets are located in different positions from those shown in screen 1. For example, each of the assets has been relocated on the screen 2 except for the promotional/advertising panel 24, 28 that remains in the same location. If, for example, the content within the promotional/advertising panel 24, 28 changes over time, the need to move this asset around the screen in order to prevent burn-in is reduced. Therefore, in situations where content of an asset is changing within its location on a particular screen, the need to move the asset around the screen is either reduced or eliminated. Such changing may be in the form of changing graphics or video content.

Figure 3:
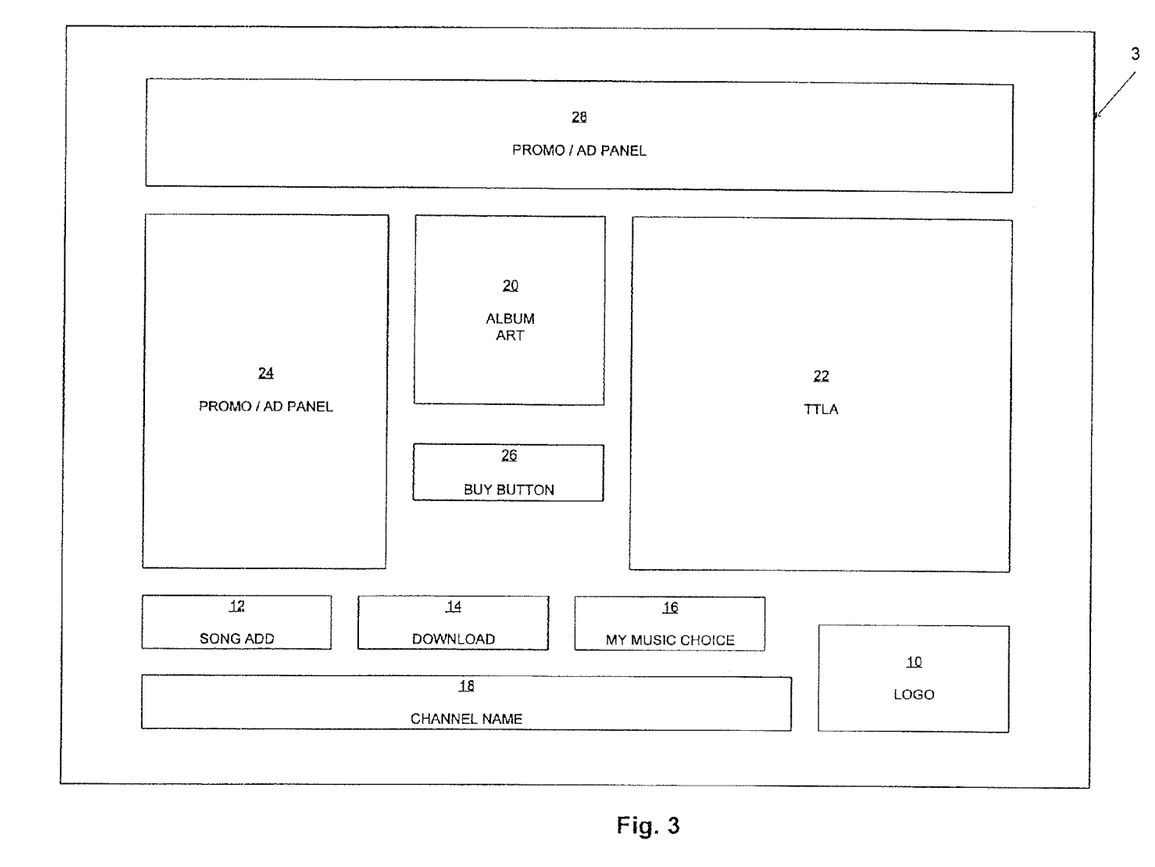
FIG. 3 is a third diagrammatic view of a screen for display according to the present invention.

FIG. 3 shows yet another screen in which all of the assets have been moved to alternate locations. The assets are moved to specified locations to prevent any stationary asset from remaining in one location on the screen for an extended period of time. The assets may be moved according to a specified movement arrangement, for example, from the arrangement of screen 1 to the arrangement of screen 2 then to the arrangement of screen 3 and subsequently to other arrangements thereafter returning to the arrangement of screen 1. The movement could alternatively be conducted according to a suitable random algorithm, which ensures that the resultant locations of each asset are such that there is no overlap of assets.

A time interval may be set for switching between screens 1, 2, and 3, or the change from screen to screen may be triggered by an event. For example, in an embodiment for transmitting a broadcast music channel, screen arrangements may change from screen 1 to screen 2 to screen 3 and other subsequent screens at the beginning of each new song being broadcast. Additionally, as mentioned above, it should be understood that assets may be selectively moved relative to each other or certain assets may remain fixed on the screen while others move. Those fixed assets are preferably ones in which the graphics, text, or video image within the asset changes at some interval. Those assets which are primarily textual or graphical and remain the same, for example the logo 10, should be moved to alternate locations from screen to screen in order to reduce screen burn-in in any one location.

An alternate embodiment of the method according to the present invention will be described with reference to FIG. 1. Instead of shuffling the assets as described above from screen 1 to screen 2 to screen 3 and so on, each asset may be incrementally moved along one or two axes on the screen as shown by the phantom lines in FIG. 1. For example, the logo 10 may be moved a given number of pixels along the y-axis a distance $\Delta y$ and may also be moved a number of pixels along the x-axis a distance $\Delta x$. It should be understood that while the logo 10 is shown as being moved in two axes it may alternatively be moved in a single axis x or y.

The movement in a single axis is best shown in the promotion/advertising panel 24, 28 which has been shifted along the x axis a small amount to the left in FIG. 1. The buy button 26 is also shown by way of example as being shifted a very small amount namely a few pixels in each of the x and y axes. It should be understood that while only three assets 10, 26, 24, 28 are shown here as being shifted or moved, each and every asset on the screen is capable of being similarly shifted either in a single axis or along both axes. Each asset may be shifted independent of the other and relative to each other without the need for shifting all assets together. In this way, assets can be shifted relative to each other incrementally along a predetermined pattern or randomly in such a way that their movement does not cause them to overlap. Additionally, the period between asset movements may be predetermined or random and the period may affect one or a plurality of assets at a given time.

An exemplary embodiment of a system for reducing burn-in of a display will now be described with reference to FIG. 4.

An audio broadcast system 40 is designed for transmitting various music channel broadcasts over a network such as a cable television network or a satellite network for distribution to a plurality of subscribers. It should be understood, however, that while the system described here is utilized for the broadcast of audio channels, the system is adaptable for use in broadcasting other content as well.

In this exemplary embodiment, a data carousel subsystem 46 retrieves data from one or a plurality of data sources 42, 44. The first data source 42 may contain, for example, information to support the channel name asset 18 and may include a song identification database, which contains playlist information, which is programmed by genre or channel for a given type of music. The first data source 42 may be managed by and associated with a server, which allows the database to be updated and managed, and also facilitates communication with the data carousel subsystem 46.

The second data source 44 may include, for example, information to support the album art asset 20, the title and track label and artist asset 22, and information to support other assets. The second data source 44 may also be associated with and connected to a server or other computer for managing the database and/or facilitating communications with the data carousel subsystem 46.

It should be understood that while two data sources are shown here, a single data source or a plurality of data sources may be connected to or in communication with the data carousel subsystem 46. The data sources 42, 44 may or may not be located in a single location and may or may not be co-located with the data carousel subsystem 46.

The data carousel subsystem 46 may be implemented utilizing a personal computer or a general-purpose computer having associated storage capabilities. The data carousel subsystem 46 receives data from data sources 42, 44 and may also receive data, which is downloadable from other data sources or entered directly into the data carousel subsystem 46 through user intervention.

The data carousel subsystem 46 contains template information including a plurality of templates for the asset arrangements of screens 1, 2, and 3. As an alternative, the template information may be housed in one of the data sources 42, 44. The data carousel subsystem 46 is capable of managing/creating the templates, which may be coded utilizing HTML, XML or other suitable protocols for creating templates/screens having text and other assets such as those described above.

Figure 2:
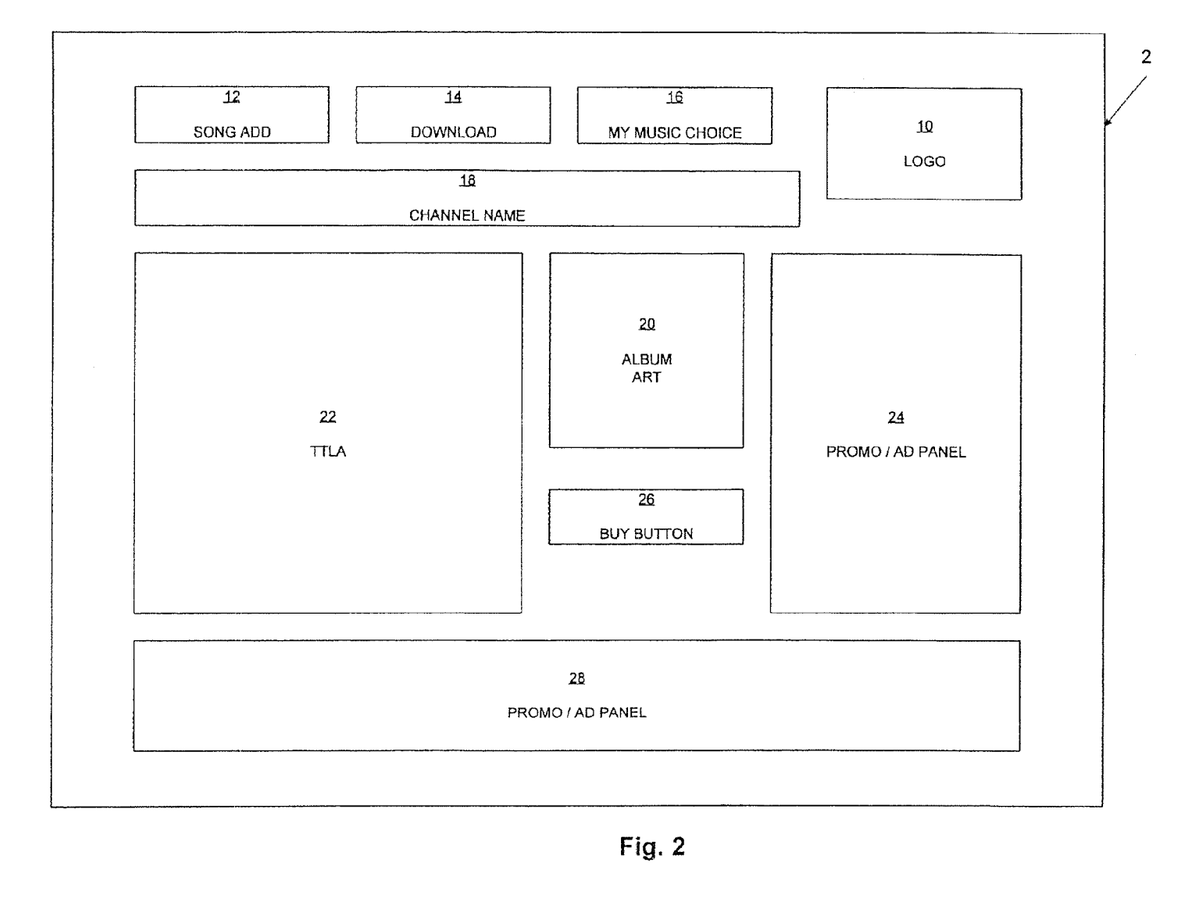
FIG. 2 is a second diagrammatic view of a screen for display according to the present invention.

Additionally, the data carousel subsystem 46 may store and execute suitable algorithms for moving selected assets such as the logo 10, the buy button 26, and the promotional/advertising panel 24, 28 as was shown and described above in the alternate methods with reference to FIGS. 1-3.

The broadcast playout system 50 is the mechanism by which fundamental programming content is played from recorded media. It is often based on commercially available broadcast automation hardware and software. The broadcast playout system 50 sends audio content (e.g., an audio work), such as a queued song, to the audio encoder 49 and, at a pre-determined time, sends a trigger to the data carousel subsystem 46 to initiate an associated data feed. The data carousel subsystem 46 generates a trigger to an encoder 47, which may be an MPEG encoder 47. In response to the trigger, the encoder 47 pulls template information, images, and text from the data carousel subsystem 46 and creates, based on the template information, a screen having embedded assets such as those shown in screens 1, 2 or 3 which are associated with the currently queued song. The screen may be a video frame, such as an MPEG video frame.

It should be understood that this process may be executed for a plurality of channels simultaneously. The MPEG encoder 47 then creates an MPEG transport stream for all channels with the embedded MPEG video frames. The MPEG encoder 47 may be implemented utilizing a commercially available encoder or a general-purpose computer.

Based upon a trigger from the broadcast playout system 50, a multiplexer 48 receives the MPEG transport stream from the MPEG encoder 47 and simultaneously receives an encoded audio feed from an audio encoder 49. The multiplexer 48 serves to combine the audio feed from the audio encoder 49 and the associated encoded MPEG transport stream from the MPEG encoder 47. The multiplexer 48 then feeds the multiplexed signal out for broadcast in the form of a video transport stream to a distribution system, such as the head end of service provider (e.g., a cable television network or a satellite network provider as is well known in the art).

Figure 6:
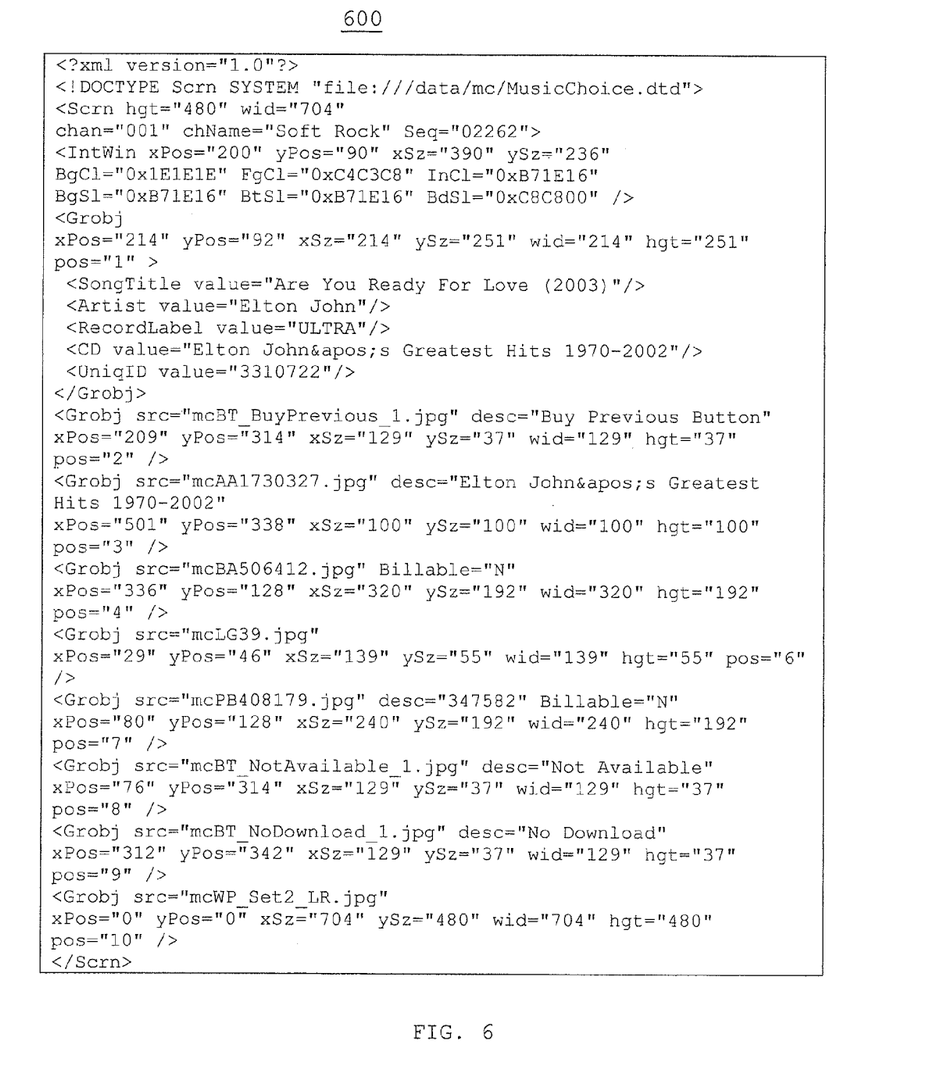
FIG. 6 illustrates example template data.

In some embodiment, the video transport stream may contain template data for each broadcast music channel included in the transport stream. Template data identifies the location and size of one or more of the assets included in an MPEG video frame created by encoder 47. FIG. 6 illustrates example template data 600, according to some embodiments, that may be included in the video transport stream.

In the embodiment shown in FIG. 6, the template data is associated with a given broadcast music channel and the audio work that is currently being broadcast on the music channel. The template data may consist of a number of tags (e.g., XML tags or other tags). In the given example, the data includes a screen tag "<Scrn>" and a number of graphic object tags "<Grobj>". The screen tag may include a number of attributes, including height ("hgt"), which may be used to identify the height of the screen, width ("wid"), which may be used to identify the width of the screen, and channel ("chan"), which may be used to identify the name of the broadcast music channel with which the template data is associated.

The graphic object tag may also include a number of attributes. For example, graphic object tag may include the following attributes: source ("src"), which may be used to identify the path and/or name of an asset; description ("desc"), which may be used to provide a description of the asset identified by the source attribute; horizontal position ("xPos"), which may be used to identify the horizontal position of the asset within the screen; vertical position ("yPos"), which may be used to identify the vertical position of the asset within the screen; width ("wid"), which may be used to identify the width the asset in pixels or some other unit; and height ("hgt"), which may be used to identify the height the asset in pixels or some other unit. The graphic object tag may be a container tag, which means that it may contain other tags. As shown in FIG. 6, the graphic object tag may include the following tags: songtitle, artist, recordlabel, CD value and uniqID.

In some embodiments, the template data described above may be generated by data carousel and provided to audio encoder 49 or MPEG encoder 47. Audio encoder 49 or MPEG encoder may place the template data within a "data pid" of the transport stream. This will allow a system at the head end of a service provider to retrieve the template data. Such a system may use the information in the template data to effect local ad insertion. That is, the system may replace one asset included in the MPEG video frame created by and received from system 40 with another asset that is stored locally with respect to the system at the head end. A system for performing this local ad insertion function is described in U.S. Provisional Patent Application No. 60/623,246, filed on Nov. 1, 2004, the contents of which are incorporated herein by this reference.

A second exemplary embodiment of an alternate system for reducing screen burn-in of a display will now be described with reference to FIG. 5. System 140 is designed for storing or locally transmitting various video and/or audio content according to the method described in reference to FIGS. 1-3 above.

Figure 4:
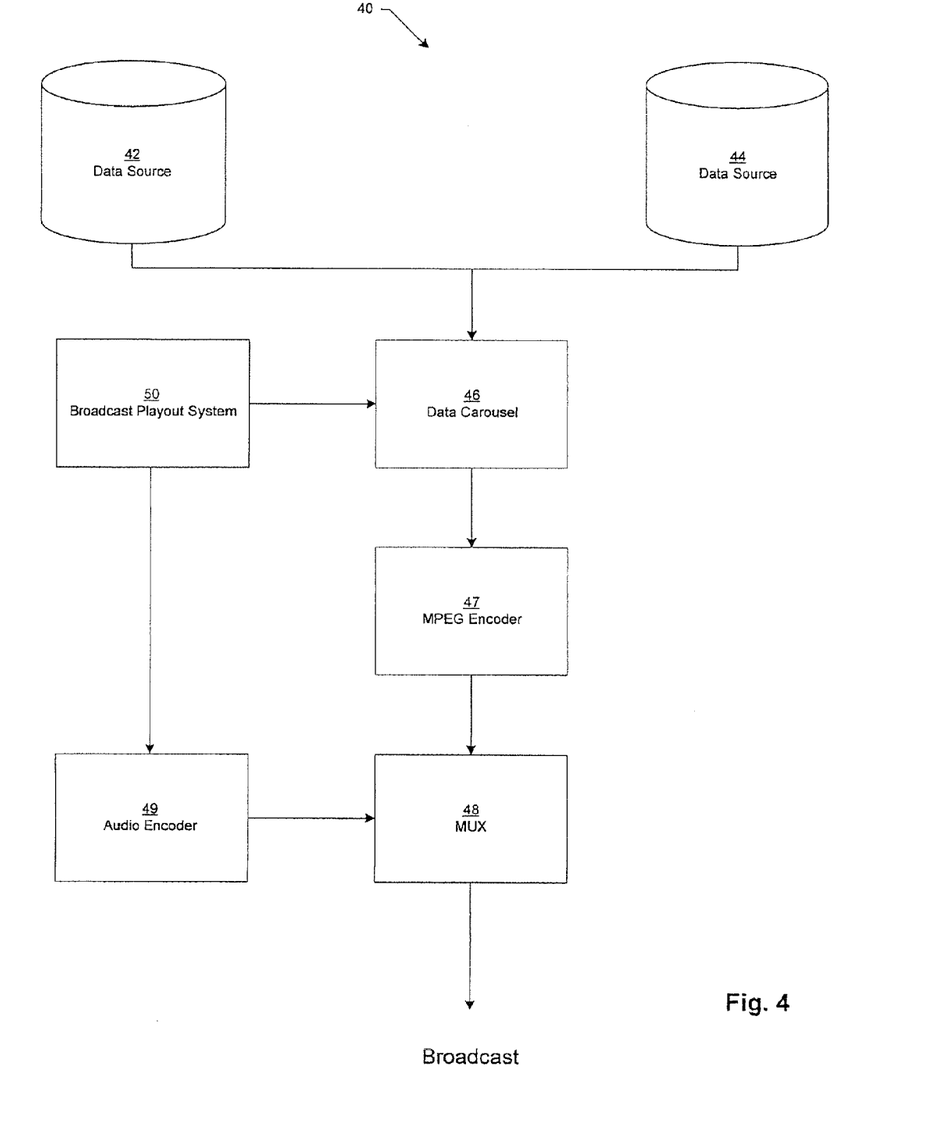
FIG. 4 is a block diagram of an exemplary system for generating screens for broadcast according the present invention.

In this second exemplary embodiment, a data carousel subsystem 146 retrieves data from one or a plurality of data sources 42, 44 as described in the embodiment of FIG. 4 above. It should be understood that the data sources 42, 44 may contain various assets not limited to those shown in the examples of FIGS. 1-3. The data carousel subsystem 146 may be implemented as part of a personal computer or general purpose computer having associated storage capabilities. Alternatively, the data carousel subsystem 146 may be implemented as a separate personal computer or general purpose computer having associated storage capabilities. The data carousel subsystem 146 contains similar template information as the data carousel subsystem 46 for creating various asset arrangements. It should be understood that the template information may be modified according to desired asset placement and replacement on the resultant screens. The data carousel subsystem 146 also has template management capabilities similar to the data carousel subsystem 46. Additionally, the data carousel subsystem 146 may store and execute suitable algorithms for moving selected assets as was shown and described above in the alternate methods with reference to FIGS. 1-3.

The image encoder 147 receives output from the data carousel subsystem 146 to create a video frame. The image encoder 147 may be implemented within a personal computer or general purpose computer or may alternatively be implemented as a separate piece of encoding equipment which is commercially available for generating encoded video frames.

An audio feed or audio encoder 149 supplies audio which is associated with the video frame output of the image encoder 147. It should be understood that the audio encoder 149 is an optional element in this system and may be removed in applications where only video without audio is desired. The audio encoder 149 may be implemented utilizing commercially available equipment or may be implemented as part of a personal or general purpose computer.

A multiplexer 148 serves to combine the audio feed/encoder output 149 with the image encoder output 147 to create a transport stream at its output. It should be understood that the audio encoder 149 and the image encoder 147 may be triggered or otherwise timed to send output to the multiplexer 148 simultaneously in order to match desired audio with desired image content. It should also be understood that the multiplexer 148 may be removed from the system 140 when the optional audio encoder 149 is not used. In this case, the image encoder 147 output could be fed directly into the storage/playout device 150 which will be described below.

The output of the multiplexer 148 is fed to a storage/playout device 150. The storage/playout device 150 may be implemented utilizing any display or transmission device which is capable of displaying or transmitting video images. Alternatively, in applications where playout is desired at a later time, the storage/playout device 150 may be implemented utilizing a recorder for creating or writing to any suitable storage medium such as DVD, CD ROM, hard disk, or any other suitable read only or rewritable storage medium. The storage/playout device 150 may be alternatively implemented utilizing portable memory devices according to PCMCIA or other suitable memory standards. The storage/playout device 150 could also be a direct playout device such as a display. The system 140 advantageously allows for utilizing the methods of the present invention for creating various stored content which when played back will reduce screen burn-in.

Figure 5:
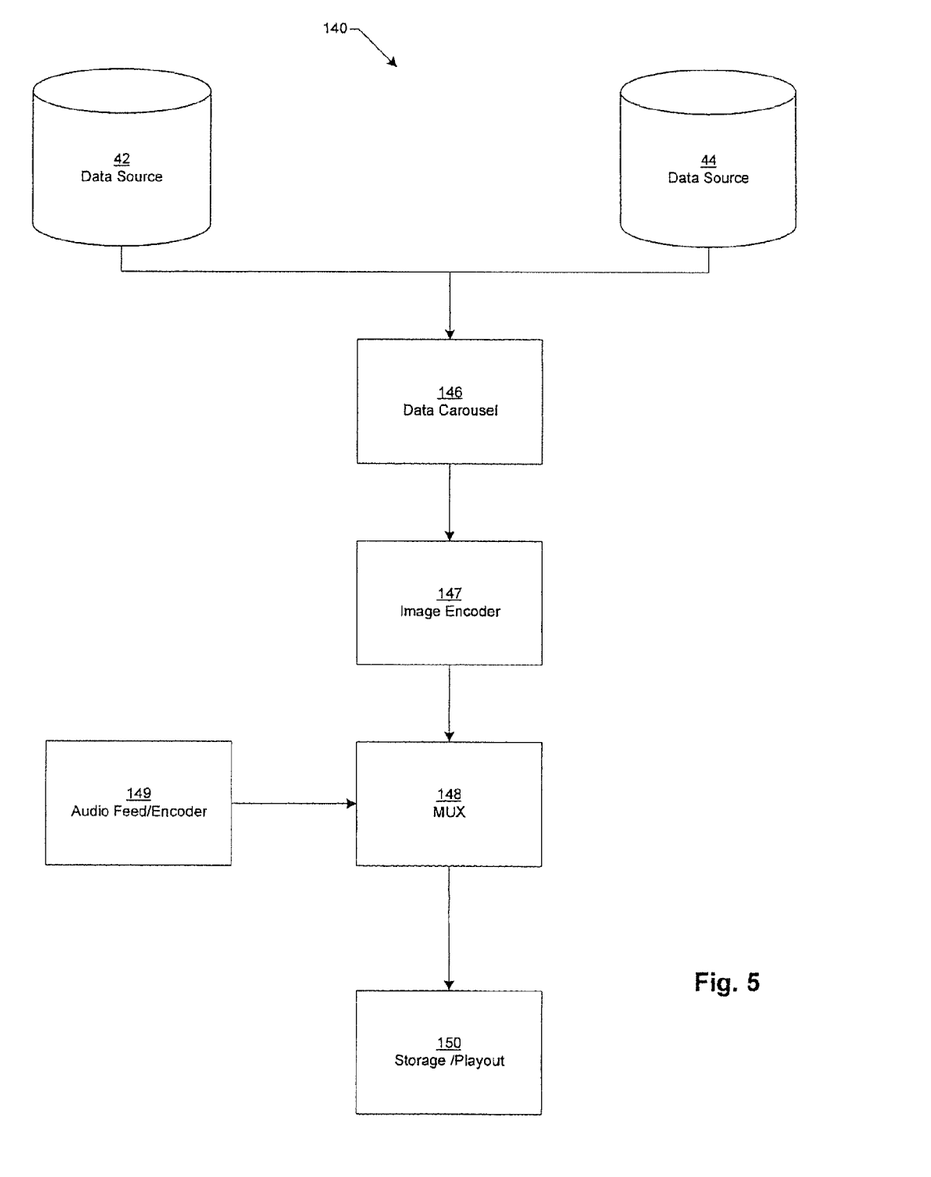
FIG. 5 is a block diagram of a second exemplary system for generating screens according to the present invention.

The elements of FIG. 5 may be incorporated within a personal or general purpose computer to reduce screen burn-in of a computer monitor by moving relatively still content on the computer display or monitor according to the methods of the present invention.

While this system 140 has been described in the context of generating a single frame or screen for display, it should be understood that this system 140 is utilized in executing the methods described above wherein the process is repeated such that assets are moved on the display according to the stored templates to reduce screen burn-in. It should also be understood that the system 140 is capable of simultaneously transmitting, playing out, or storing such content for later play back utilizing the methods disclosed above.

The system 140 advantageously reduces screen burn in by moving assets on the screen according to stored template information without modifying a transmitted TV signal or video transport stream. Assets are shifted on screen prior to output of the transport stream therefore eliminate the need to modify any signal at the display as required by the prior art.

The foregoing illustrates some of the possibilities for practicing the invention. Many other embodiments are possible within the scope and spirit of the invention. For example, it should be understood that this method and system may be applicable to broadcast systems as well as systems that display information from sources local to the display, including but not limited to video disc players, computers, etc. It is, therefore, intended that the foregoing description be regarded as illustrative rather than limiting, and that the scope of the invention is given by the appended claims together with their full range of equivalents.

What is claimed is:

1. A method for reducing burn-in of a display, comprising the steps of:
   (a) selecting programming content, the programming content being associated with an artist;
   (b) after selecting the programming content, transmitting data corresponding to the selected programming content so that the transmitted data will be received by a receiving device; and
   (c) while transmitting the data corresponding to the selected programming content, further performing the steps of:
   (c1) transmitting a first video frame so that the first video frame will be received by the receiving device, wherein the first video frame comprises (1) a logo positioned at a first location in the video frame and (2) artist information that identifies the artist associated with the selected programming content positioned at a third location in the video frame;
   (c2) after transmitting the first video frame, transmitting a second video frame so that the second video frame will be received by the receiving device, wherein the second video frame comprises the logo, but the position of the logo within the second video frame is different than the position of the logo within the first video frame.

2. The method of claim 1, wherein the step of transmitting the first video frame comprises multiplexing the first video frame with data corresponding to the selected programming content to form a multiplexed signal and transmitting the multiplexed signal to a head end of a service provider using a broadband network.

3. The method of claim 1, further comprising:
(c3) after transmitting the second video frame, transmitting a third video frame, wherein the third video frame includes the logo and an art asset, wherein the art assets is not included in the first video frame and step (c3) is also performed while the step of transmitting data corresponding to the selected programming content is performed.

4. The method of claim 3, wherein the art asset is an image of a cover for a set of recordings that includes the selected programming content.

5. The method of claim 1, further comprising: (c3) transmitting asset position data that includes information identifying the position of an advertisement included in the first video frame, wherein the asset position data is transmitted while the step of transmitting data corresponding to the selected programming content is performed and before the second video frame is transmitted.

6. The method of claim 1, wherein the second video frame further includes track title information, but the position of the track title information within the second video frame is different than the position of the track title information within the first video frame.

7. The method of claim 1, wherein the programming content is further associated with an album and a music label, and the first video frame further comprises (1) album information that identifies the album associated with the selected programming content and (2) music label information that identifies the music label associated with the selected programming content.

8. The method of claim 1, wherein:
the first video frame further comprises channel information identifying a channel,
the second video frame further comprises the channel information, and
the position of the channel information relative to the logo is the same in the first video frame as in the second video frame.

9. A method for reducing burn-in of a display, comprising the steps of:
(a) selecting programming content;
(b) after selecting the programming content, transmitting to a receiving device data corresponding to the selected programming content; and
(c) while transmitting to the receiving device data corresponding to the selected programming content, further performing the steps of:
(c1) transmitting a first video frame to the receiving device, wherein the first video frame comprises (1) a first graphic object positioned at a first location in the video frame, (2) a logo positioned at a second location in the video frame, and (3) channel information identifying a channel positioned at a third location in the video frame;
(c2) after transmitting the first video frame to the receiving device, transmitting a second video frame to the receiving device, wherein the second video frame includes the logo, the channel information and a second graphic object, but not the first graphic object, wherein the second graphic object is not included in the first video frame.

10. The method of claim 9, wherein the step of transmitting the first video frame to the receiving device comprises multiplexing the first video frame with data corresponding to the selected programming content to form a multiplexed signal and transmitting the multiplexed signal to a head end of a service provider using a broadband network.

11. The method of claim 9, further comprising:
(c3) after transmitting the second video frame to the receiving device, transmitting a third video frame to the receiving device, wherein the third video frame includes the logo and an album art asset, wherein step (c3) is also performed while the step of transmitting data corresponding to the selected programming content to the receiving device is performed.

12. The method of claim 11, wherein the album art asset is an image of a cover for a set of recordings that includes the selected programming content.

13. The method of claim 9, further comprising: (c3) transmitting asset position data that includes information identifying the position of the first graphic object in the first video frame, wherein the asset position data is transmitted while the step of transmitting data corresponding to the selected programming content to the receiving device is performed and before the second video frame is transmitted.

14. The method of claim 9, wherein the second video frame further includes track title information identifying a title associated with the selected programming content.

15. The method of claim 14, wherein the second video frame further comprises album information that identifies an album associated with the selected programming content.

16. The method of claim 9, wherein:
the position of the logo within the second video frame is different than the position of the logo within the first video frame,
the position of the channel information within the second video frame is different than the position of the channel information within the first video frame, and
the position of the channel information relative to the logo is the same in the first video frame as in the second video frame.

17. A method for reducing screen burn-in, comprising:
(a) selecting programming content, the programming content being associated with an artist and a track title;
(b) after selecting the programming content, transmitting to a receiver data corresponding to the selected programming content; and
(c) while transmitting to the receiver data corresponding to the selected programming content, further performing the steps of:
(c1) transmitting to the receiver first video data defining a first picture, the first picture comprising a plurality of assets, the plurality of assets comprising: (1) a logo, (2) an asset related to the programming content, and (3) a third asset identifying the track title associated with the programming content, wherein the asset related to the programming content is positioned at a first position within the first picture, the logo is positioned at a second position within the first picture, and the third asset is positioned at a third position within the first picture;
(c2) after transmitting the first video data, transmitting to the receiver second video data defining a second picture, the second picture comprising the asset related to the programming content, wherein, for the second picture, the asset related to the programming content has a position that is the same as the position it had for the first picture, but at least one of the plurality of assets is not positioned in the second picture at the same location at which it was positioned in the first picture; and (c3) after transmitting the second video data, transmitting to the receiver third video data defining a third picture, the third picture comprising said at least one of the plurality of assets, wherein, for the third picture, said at least one of the plurality of assets has a position that is the same as the position it had for the first picture.

18. The method of claim 17, wherein said at least one of the plurality of assets is the logo or the third asset.

19. The method of claim 17, wherein the third picture further comprises the asset related to the programming content and, for the third picture, the asset related to the programming content has a position that is the same as the position it had for the first picture.

20. The method of claim 17, further comprising performing the following step while transmitting to the receiver data corresponding to the selected programming content:

(c4) after transmitting the third video data, transmitting to the receiver fourth video data defining a fourth picture, the fourth picture comprising (1) the logo, (2) the third asset, and (3) a channel name asset, wherein the channel name asset is positioned at a first position within the fourth picture, the logo has a position in the fourth picture that is the same as the position it had for the first picture, and the third asset has a position in the fourth picture that is the same as the position it had for the first picture.

* * * * *